US012755879B2

(12) United States Patent
Meinke

(10) Patent No.: US 12,755,879 B2
(45) Date of Patent: *Oct. 6, 2026

(54) METHOD OF MANUFACTURING PERMANENT MAGNETS

(71) Applicant: Advanced Magnet Lab, Inc., Melbourne, FL (US)

(72) Inventor: Rainer Meinke, Concord, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,683

(22) Filed: Sep. 18, 2023

(65) Prior Publication Data

US 2024/0006100 A1 Jan. 4, 2024

Related U.S. Application Data

(63) Continuation of application No. 16/089,716, filed as application No. PCT/US2017/025212 on Mar. 30, 2017, now Pat. No. 11,842,832.

(Continued)

(51) Int. Cl.

*H01F 41/02* (2006.01)
*B22F 3/12* (2006.01)

(Continued)

(52) U.S. Cl.

CPC .............. *H01F 1/0577* (2013.01); *B22F 3/12* (2013.01); *B22F 3/16* (2013.01); *B22F 3/17* (2013.01); *B22F 3/24* (2013.01); *B22F 5/12* (2013.01); *C22C 1/02* (2013.01); *H01F 41/0266* (2013.01); *H01F 41/0273* (2013.01); *B22F 2003/245* (2013.01); *B22F 2003/247* (2013.01); *B22F 2003/248* (2013.01); *B22F 9/04* (2013.01);

(Continued)

(58) Field of Classification Search

None

See application file for complete search history.

(56) References Cited

U.S. PATENT DOCUMENTS 4,990,306 A * 2/1991 Ohashi .................. H01F 1/0577 419/30
7,948,135 B2 * 5/2011 Sato .................... H01F 41/0266 310/156.43

(Continued)

*Primary Examiner* — Xiaowei Su

(74) *Attorney, Agent, or Firm* — Lowndes; Stephen C. Thomas; Robert R. Fredeking

(57) ABSTRACT

A continuous method of manufacturing permanent magnets and the permanent magnets created thereby. A fine powder is created from a combination of magnetic metals. The powder (a metal alloy) is placed in a non-magnetic container of any desired shape which could be, for example, a tube. The metal alloy and tube are swaged while a magnetic field is applied. Once swaging is complete, the metal alloy and tube are sintered and then cooled. Instead of sintering, a bonding agent can mixed into the powder. Following cooling, the metal alloy is magnetized by placing it between poles of powerful electromagnets with the desired field direction. The process of the invention enables mass-produced, cost-effective PM products, which are more robust, easily assembled into products, enables new "wire like" shapes with arbitrary magnetization direction. The process enables mass production of permanent magnets of any desired cross section, produces permanent magnets continuously that may be cut to any length, and may, in an embodiment, result in directional magnets.

15 Claims, 6 Drawing Sheets

Related U.S. Application Data

(60) Provisional application No. 62/315,622, filed on Mar. 30, 2016, provisional application No. 62/314,991, filed on Mar. 30, 2016.

(51) Int. Cl.

| | |
|---|---|
| ***B22F 3/16*** | (2006.01) |
| ***B22F 3/17*** | (2006.01) |
| ***B22F 3/24*** | (2006.01) |
| ***B22F 5/12*** | (2006.01) |
| ***B22F 9/04*** | (2006.01) |
| ***C22C 1/02*** | (2006.01) |
| ***H01F 1/057*** | (2006.01) |
| *B22F 9/06* | (2006.01) |
| *H01F 7/02* | (2006.01) |
| *H01F 13/00* | (2006.01) |

(52) U.S. Cl.
CPC ............ *B22F 9/06* (2013.01); *B22F 2202/05* (2013.01); *B22F 2998/10* (2013.01); *B22F 2999/00* (2013.01); *C22C 2202/02* (2013.01); *H01F 7/0242* (2013.01); *H01F 13/003* (2013.01)

(56) References Cited

U.S. PATENT DOCUMENTS

| | | | | |
|---|---|---|---|---|
| 9,672,980 | B2 * | 6/2017 | Peng | C22C 38/10 |
| 11,842,832 | B2 * | 12/2023 | Meinke | B22F 3/17 |
| 2010/0045411 | A1 * | 2/2010 | Kobayashi | B22F 7/02 335/302 |
| 2015/0179320 | A1 * | 6/2015 | Furusawa | B22F 7/02 419/62 |
| 2016/0055969 | A1 * | 2/2016 | Haga | B22F 3/24 419/8 |

* cited by examiner

METHOD OF MANUFACTURING PERMANENT MAGNETS

RELATED APPLICATIONS

This nonprovisional patent application for patent claims benefit and is a continuation of U.S. nonprovisional patent application Ser. No. 16/089,716 titled METHOD OF MANUFACTURING PERMANENT MAGNETS filed in the USPTO on Sep. 28, 2018, which published as Pre-grant Publication No.: US 2019/0122818 A1 on Apr. 25, 2019, which is hereby incorporated by reference in its entirety; which is a US national stage entry of international application for patent number PCT/US17/25212 titled METHOD OF MANUFACTURING PERMANENT MAGNETS given an international filing date of Mar. 30, 2017, which published as WIPO publication no. WO 2017/173186 on May 10, 2017, which is hereby incorporated by reference in its entirety; which claims the benefit of U.S. provisional patent application No. 62/315,622 filed in the USPTO titled METHOD OF MANUFACTURING PERMANENT MAGNETS on Mar. 30, 2016, which is hereby incorporated herein by reference in its entirety; also claiming the benefit of priority of U.S. provisional patent application No. 62/314,991 titled DUAL-ROTOR SYNCHRONOUS ELECTRICAL MACHINES filed in the USPTO on Mar. 30, 2016, which is hereby incorporated herein by reference in its entirety.

FIELD OF THE INVENTION

The present disclosure generally relates to permanent magnets; more specifically, the present disclosure relates to a method of manufacturing permanent magnets comprising a powdered metal alloy contained within an enclosed volume of a container of any desired cross sectional shape.

BACKGROUND

Permanent magnets with high energy products, such as neodymium-iron-boron magnets, are conventionally produced with a modified powdered metallurgical process in simple geometrical forms like discs, cuboids and parallelepiped. A conventional process of manufacturing an exemplary combination of metals, neodymium-iron-boron, is shown and described with reference to FIG. 1.

First, powdered metals are created. To do this, the appropriate amounts of neodymium, iron, and boron are combined and heated to the melting point under vacuum. As used herein, “alloy” is used to refer to the resulting substance in both liquid and solid states. The vacuum prevents any chemical reaction between air and the melting materials that might contaminate the final metal alloy. Once the metal alloy has cooled and solidified, it is broken up and crushed into small pieces, which are ground into a fine powder creating a powdered metal alloy.

Next, the powdered metal alloy is pressed. In this process, the powder is placed in a die that has the shape of the finished magnet. A magnetic field is applied to the powder to line up the powder particles. While the magnetic force is being applied, the powder is pressed from the top and bottom with hydraulic or mechanical rams to compress it to within about 0.125 inches (0.32 cm) of its final intended thickness. Typical pressures are about 10,000 psi to 15,000 psi (70 MPa to 100 MPa). Some shapes are made by placing the powder in a flexible, air-tight, evacuated container and pressing it into shape with liquid or gas pressure. This is known as isostatic compaction.

Once compressed, the powdered metal alloy is heated. The metal alloy is removed from the die and placed in an oven for sintering, which fuses the powder into a solid piece. The process usually consists of three stages. In the first stage, the alloy is heated at a low temperature to slowly drive off any moisture or other contaminants that may have become entrapped during the pressing process. In the second stage, the temperature is raised to about 70-90% of the melting point of the metal alloy and held there for a period of several hours or several days to allow the small particles to fuse together. Finally, the alloy is slowly cooled down in controlled, step-by-step temperature increments.

The sintered metal alloy then undergoes a second controlled heating and cooling process known as annealing. This process removes any residual stresses within the alloy and strengthens it.

Then, a finishing process takes place. The annealed metal alloy is very close to the finished shape and required dimensions. A final machining process removes any excess material and produces a smooth surface. The alloy is then given a protective coating to seal the surfaces.

Once in its finished form, the metal alloy is magnetized. Up to this point, the metal alloy is just a piece of compressed and fused metal. Even though it was subjected to a magnetic force during pressing, that force did not magnetize the alloy, it simply lined up the loose powder particles. To turn it into a magnet, the alloy is placed between the poles of a powerful electromagnet and oriented in the desired direction of magnetization. The electromagnet is then energized for a period of time. The magnetic force aligns the groups of atoms, or magnetic domains, within the material to transform the alloy into a strong permanent magnet.

Each step of the conventional manufacturing process is monitored and controlled. The sintering and annealing processes are especially critical to the final mechanical and magnetic properties of the magnet, and the variables of time and temperature must be closely controlled.

The standard geometrical forms produced by this conventional method are insufficient for many applications. More complex shapes and magnetization directions are needed. For example, Halbach arrays formed from permanent magnets use complex shapes and magnetization directions. To create permanent magnets for Halbach arrays using conventional methods either complex molds (dies) are needed to produce the permanent magnets or the standard geometrical forms have to be machined to yield the required shapes. Both of these manufacturing processes are complex and expensive. Machining of permanent magnet materials, in particular, is difficult, since the material is very hard and brittle, causing wear-out and breakage of cutting tools. The manufacture of large permanent magnet arrays is further complicated by a difficult assembly process, in which substantial repulsive or attractive magnetic forces have to be overcome during manufacturing processes.

Therefore, what is needed in the art is a more efficient manufacturing method that can create permanent magnets of more complex shapes and magnetization directions and results in permanent magnets which are more structurally robust and are able to resist structural failure under point or distribute loads that may be experienced during manufacture, shipping, assembly and use.

SUMMARY OF THE INVENTION

In accordance with the teachings disclosed herein, embodiments related to a method of manufacturing permanent magnets are disclosed.

The invention is a novel and enabling process for economical production of permanent magnets, having the potential to revolutionize permanent magnet manufacturing; lower cost product, lower cost and safer assembly of magnet-based products, enabler for the application of future permanent magnet materials and enabling new magnet-based products having potential for high-impact solutions for energy, medical, transportation and environmental industries. The novel Permanent Magnet (PM) manufacturing technology of the invention, termed PM-Wire, overcomes many inherent issues with conventional magnet production methods. The process of the invention enables mass-produced, cost-effective PM products, which are more robust, easily assembled into products and enables new "wire like" shapes and significantly increases energy density. The novel process comprises a "powder-in-tube" process that is continuous and may utilize drawing, packing and shaping processes, allows for mass production of permanent magnets of any desired shape or cross section, produces permanent magnets continuously that may be cut to any length, and may, in an embodiment, result in magnets with a desired magnetization direction.

In an embodiment, a method manufacturing a permanent magnet comprises heating a plurality of magnetic metals to their melting point under vacuum to create a metal alloy, allowing the metal alloy to cool and solidify and then grounding the metal alloy into a fine powder. The plurality of magnetic metals may be neodymium, iron and boron. The metal alloy powder is then placed in a tube or other shaped container. The tube or other shaped container may comprise a non-magnetic metal. A magnetic field is applied to the metal alloy while the metal alloy and tube it is contained in are compressed. The process of compressing the metal alloy and tube may comprise swaging the metal alloy and tube or other shaped container. The metal alloy and tube are then sintered and cooled. After cooling, the metal alloy is magnetized. Magnetization may comprise placing the metal alloy between two poles of an electromagnet and energizing the electromagnet In another embodiment, a permanent magnet is prepared by the above process.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

DETAILED DESCRIPTION OF THE PREFERRED EMBODIMENTS

A detailed description of the embodiments for a method of manufacturing permanent magnets will now be presented with reference to FIGS. 2 through 8. One of skill in the art will recognize that these embodiments are not intended to be limitations on the scope, and that modifications are possible without departing from the spirit thereof. In certain instances, well-known methods, procedures and components have not been described in detail.

As used herein, "tube" includes within its definition any desired shape enclosing an interior volume.

As used herein, "PM Wire" is used to refer to any permanent magnet shape or configuration produced by the inventive method, and is therefore not limited only to "wire" constructs or shapes.

Embodiments of the manufacturing process disclosed herein overcome some of the inherent issues with the conventional manufacturing method and, in particular, enable cost effective manufacturing of complex magnetic arrays, such as Halbach arrays. Embodiments of the manufacturing process enable mass production of permanent magnets that are more mechanically robust than conventional permanent magnets and more easily assembled into complex arrays. In some cases, permanent magnets created can be bent into arcs.

An exemplary embodiment of the inventive process for manufacturing a permanent magnet is shown and described with reference to FIG. 2. An exemplary list of magnetic metals that may be used in the apparatus and method are neodymium, iron, cobalt, boron, gadolinium, dysprosium and alloys such as steel that contain ferromagnetic metals, alone or in any combination. These identified magnetic metals listed of should not be taken as limiting. Any magnetic material can be used in the process of the invention to produce permanent magnets of a desired magnetic material or combination of materials. In particular, various novel magnetic materials, currently under development, which are not based on rare-earth materials, can be used.

Figure 2:
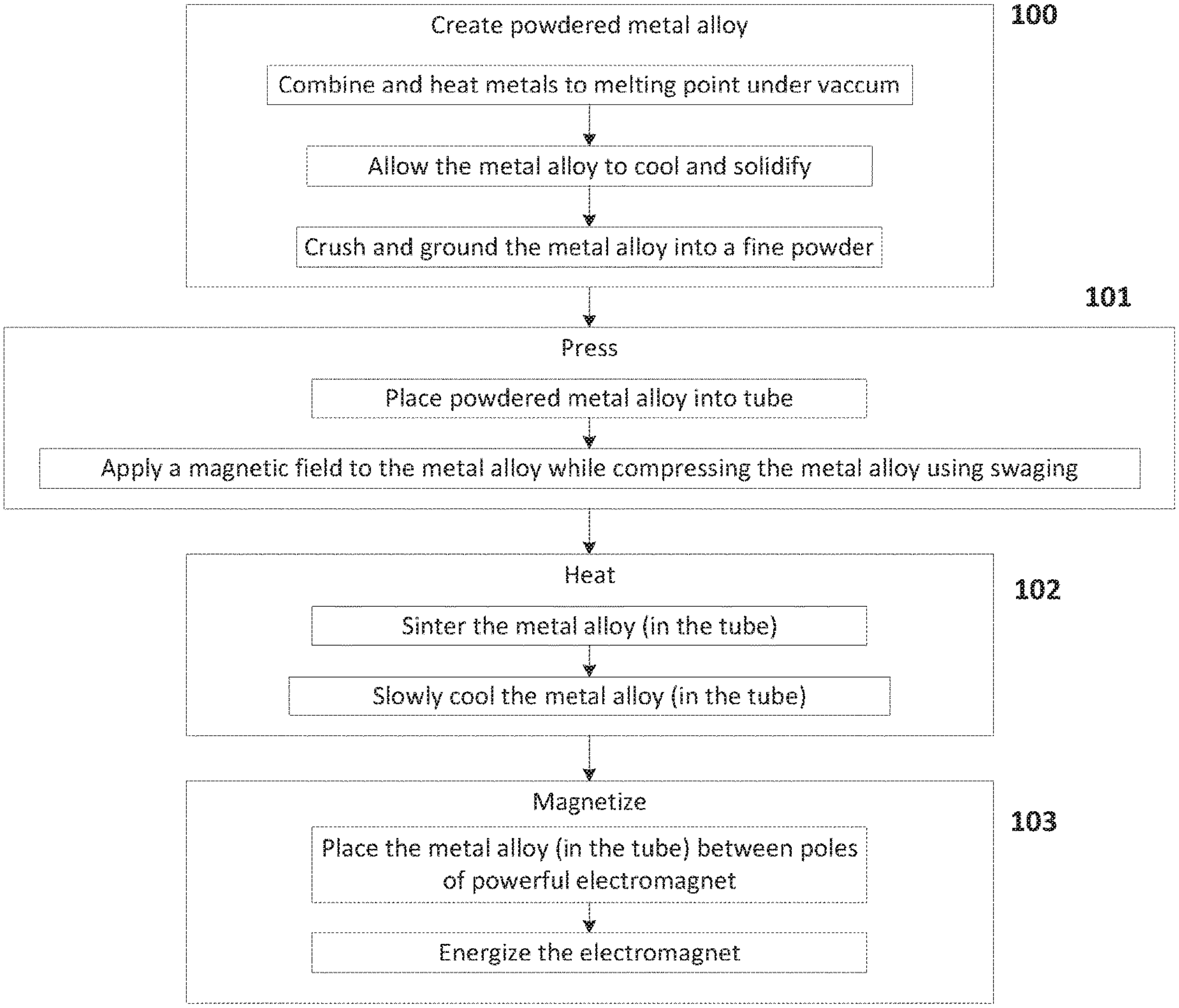
FIG. 2 is a flowchart of a method of manufacturing a permanent magnet according to an embodiment of the present invention.

Referring now to FIG. 2, in a first, step 100, powdered metals are created. To do this, the appropriate amounts of magnetic materials such as, for example and not by way of limitation, neodymium, iron and boron are combined and heated to their melting point under vacuum. The vacuum prevents any chemical reaction between air and the melting materials that might contaminate the final metal alloy. Once the metal alloy has cooled and solidified, it is broken up and crushed into small pieces, which are ground into a fine powder creating a powdered metal alloy.

Figure 3A:
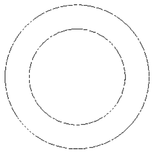
FIGS. 3A and 3B are a cross-sectional view (3A) and a perspective view (3B) of a cylindrical tube for use with embodiments of the present invention.
Figure 4A:
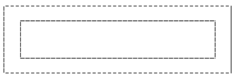
FIGS. 4A and 4B are a cross-sectional view (4A) and a perspective view (4B) of a rectangular prism-shaped tube for use with embodiments of the present invention.
Figure 5A:
FIGS. 5A and 5B are a cross-sectional view (5A) and a perspective view (5B) of a square prism-shaped tube for use with embodiments of the present invention.
Figure 3B:
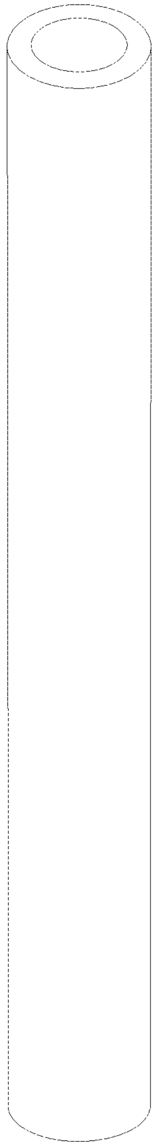
Figure 4B:
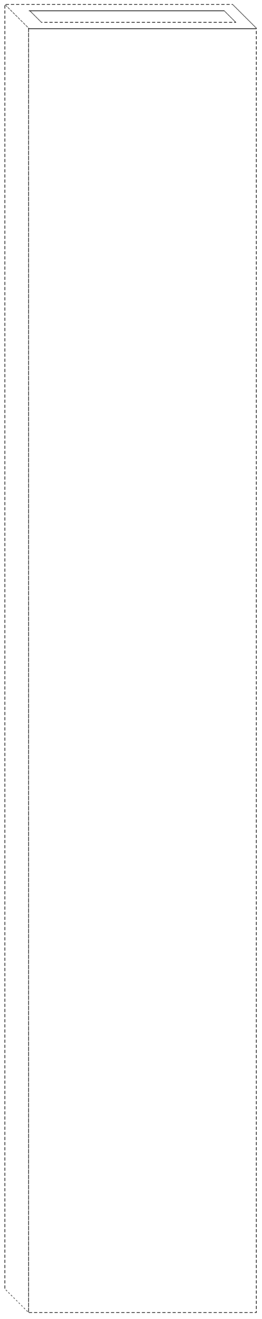
Figure 5B:
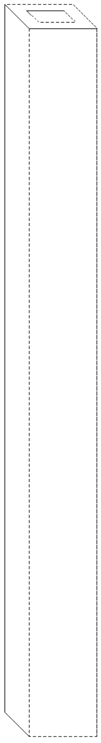

Still referring to FIG. 2, in a second step 101, pressure is applied to the powdered metal alloy. In this process, the powder is inserted into a tube or other-shaped container of a non-magnetic metal depicted as 001 in FIG. 6C. The non-magnetic metal tube or other-shaped container may be, for example, stainless steel or titanium. The material has to be non-magnetic to allow unhampered penetration of magnetic flux through the tube or other shaped container wall. While the powder is being exposed to a magnetic field to align crystals, swaging is used to compress the powder. The resulting shape can vary depending on the swaging process. Exemplary resulting tube shapes include cylindrical, rectangular prism, square prism, and pie-shaped. Cross-sectional and perspective views of a cylindrical tube are shown in FIGS. 3A and 3B, respectively. Cross-sectional and perspective views of a rectangular prism-shaped tube are shown in FIGS. 4A and 4B, respectively. Cross-sectional and perspective views of a square prism-shaped tube are shown in FIGS. 5A and 5B, respectively. The outer dimensions of the original tube or other-shaped container can vary depending on the desired diameter of the resulting tubes after swaging. The length of the tube can also vary and can be significant. For example, a resulting tube may be one meter long and have a diameter or cross-sectional length of two centimeters or more. Even tubes with very small diameter that can be described as wires are producible by the process of the invention. While the enclosed volume is described herein as a tube for convenience, the container of the invention may take any desired shape as long as it has an interior volume able to contain the powdered metal alloy as described herein.

Still referring to FIG. 2, in a third step 102, once compressed, the powdered metal alloy is heated. The powdered metal alloy, still in its tube, is sintered with the appropriate temperature profile. The alloy is then slowly cooled down.

As an alternative to the sintering process of steps 102 and 202, a bonding agent, such as a chemical bonding agent, epoxy, or the like may be mixed with the powdered metal alloy. The bonding agent is then cured, producing a permanent magnet of a desired shape that is ready for final finishing.

Still referring to FIG. 2, after cool-down, the alloy, still in its tube or other-shaped container (FIG. 2), is magnetized 103. For most applications the magnetization direction will be chosen to be perpendicular to the tube axis. For shorter tube sections, the magnetization direction may also be along the tube axis.

Figure 1:
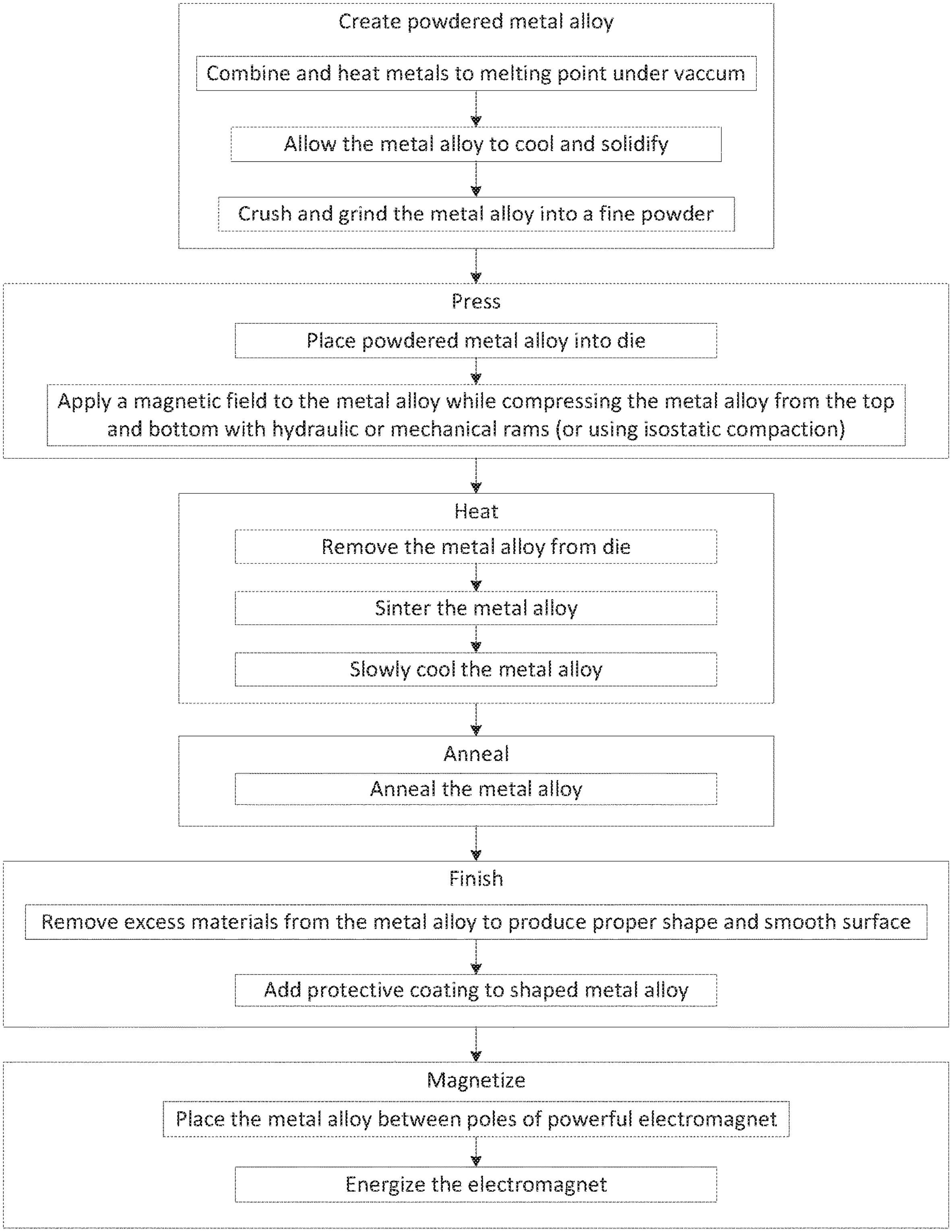
FIG. 1 is a flowchart of a conventional method of manufacturing a permanent magnet.

With this powder-in-tube process depicted in FIG. 2, no annealing and machining of the sintered alloy is needed, and no further surface coating, as required for conventional permanent magnets, is required. This is but one of many reasons the inventive method and product produced by the method is an improvement in the state of the art of permanent method manufacture. It can be seen that the inventive method of producing permanent magnets of FIG. 2 comprises fewer steps and is therefore more efficient than the conventional method of producing permanent magnets depicted in FIG. 1.

Using the resulting tubes of permanent magnets, complex assemblies such as, for example, Halbach arrays can be produced. The surrounding support tube, or other-shaped container, provides mechanical strength, which aids in the handling of the permanent magnets created using the powder-in-tube process. Included within the scope of the invention are Halbach arrays comprising permanent magnets produced by the processes and methods described herein.

For powder-in-tube magnets with large aspect ratios of tube length to diameter, for example a length of 500 mm and an outer tube diameter of 5 mm, or wires, a slight bending of the final magnet is possible, creating an arc.

Figures 6A, 6B, 6C:
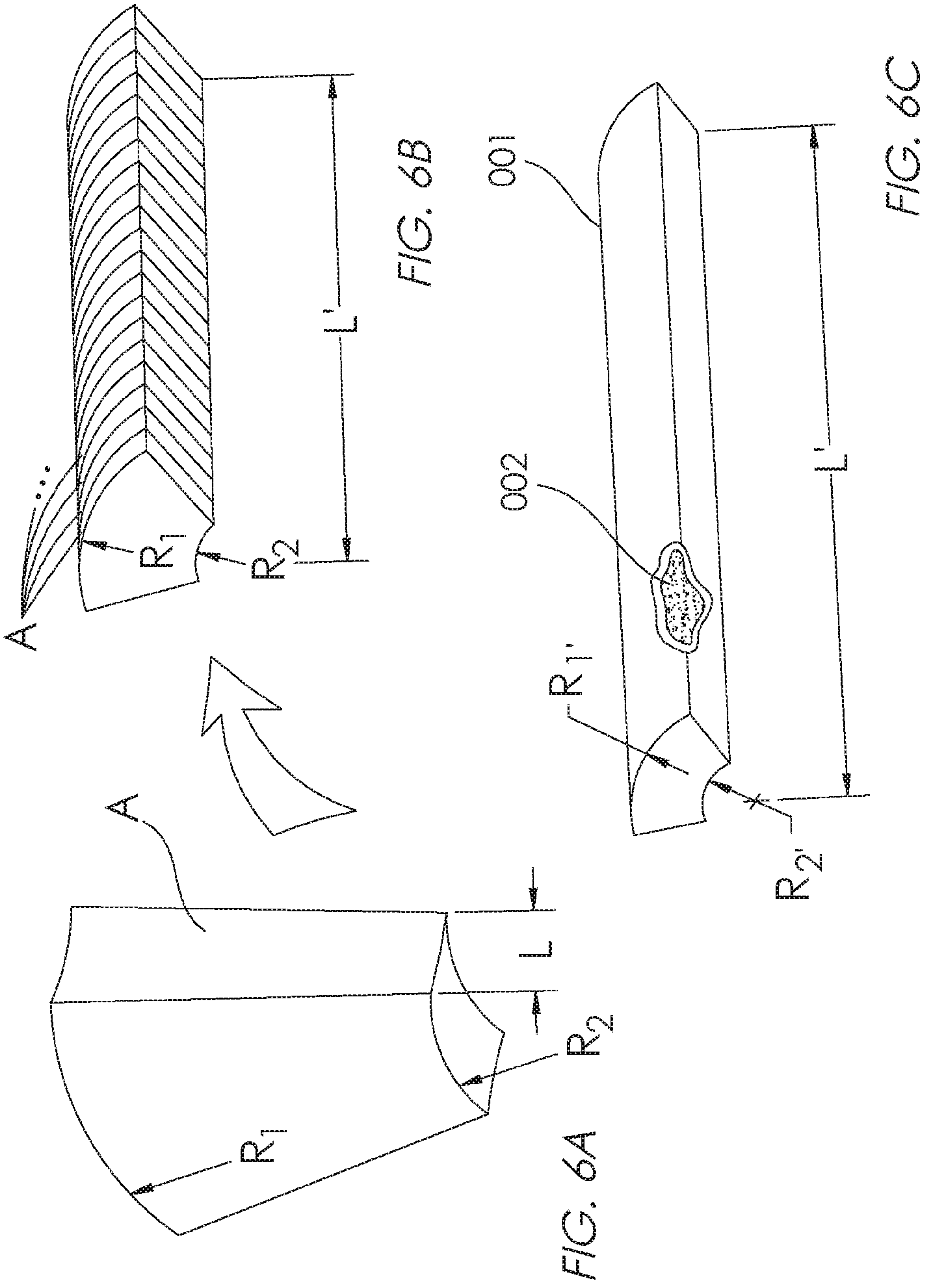
FIGS. 6A and 6B depict perspective views traditional of a permanent magnet (6A) and a traditional permanent magnet array (6B), for the purpose of demonstrating the disadvantage thereof.
FIG. 6C depicts a perspective view of an exemplary pie-shaped cross section permanent magnet wire (PM Wire) produced by the process of the invention as might be used to construct a Halbach array.
Figure 7:
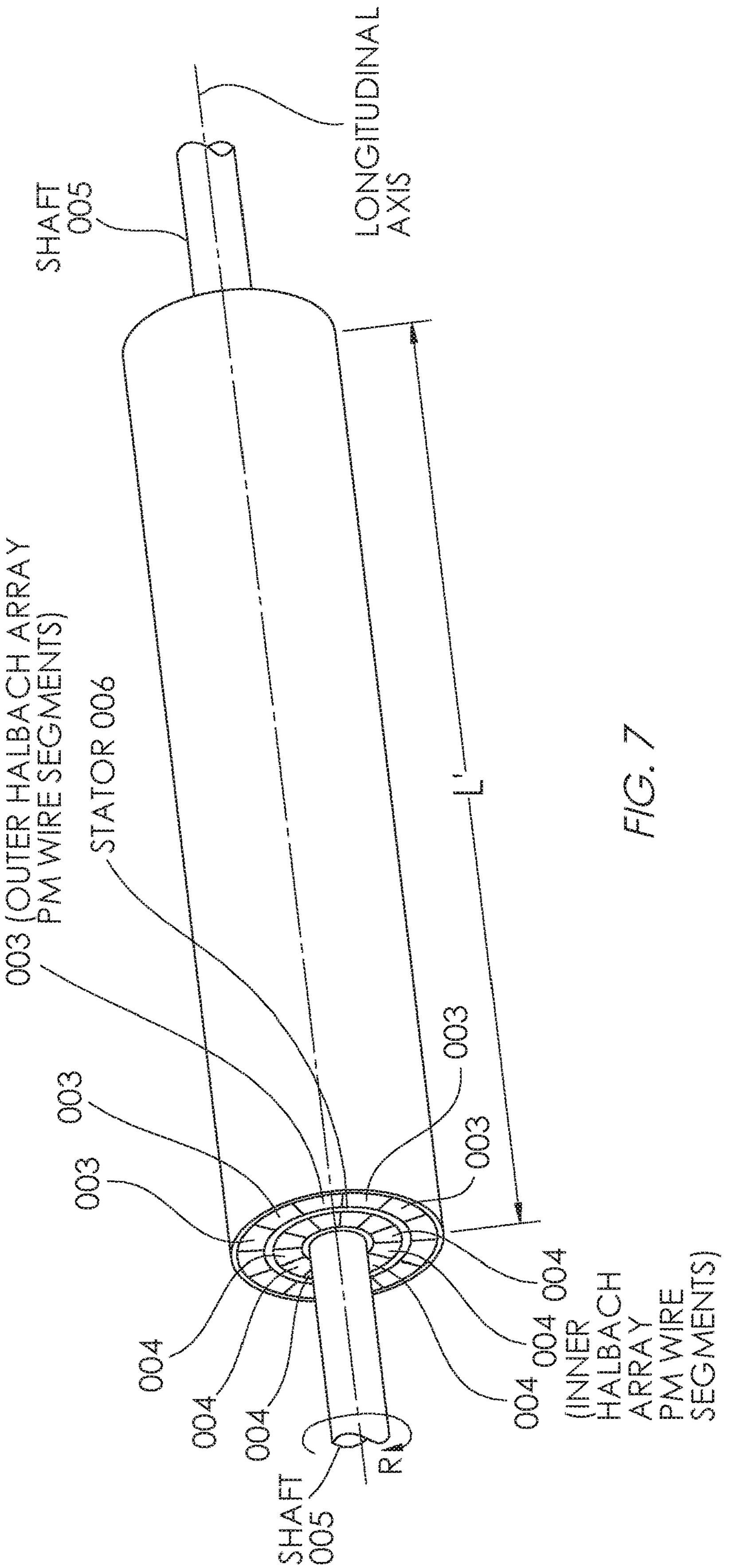
FIG. 7 depicts a perspective view of a dual rotor machine using Halbach arrays constructed from PM Wire produced by the process of the invention.

Referring now to FIGS. 6A, 6B, 6C, and 7, an application of the inventive method for producing a permanent magnet which results in a permanent magnet wire (PM-Wire) of pie-shaped cross section is depicted. It is to be understood that the example PM Wire cross section depicted in these figures is one of many cross sections of the PM Wire that may be produced by the process of the invention and that numerous other cross sectional shapes are within the scope of the invention. Further, the exemplary dual Halbach array application depicted in FIG. 7 is but one of many applications of the process and permanent magnet(s) that may be produced by the process. The exemplary application depicted in FIG. 7 is a dual-Halbach array electric motor that may be used in electric engines for aircraft propulsion. One advantage of the pie-shaped PM Wire produced by the process of the invention, as depicted in FIGS. 6C and 7, is the enablement of smaller diameter electric engines producing magnetic field strengths of up to 2.0 tesla, or greater. This is especially true when stator 006 is a double-helix or direct double helix conductor configuration as described in U.S. Pat. Nos. 7,889,042, 7,990,247, or 8,424,193, each of which are incorporated herein by reference in their entirety. To demonstrate the advantage over the prior art, a permanent magnet A produced by traditional means is shown for reference in FIG. 6A, and an array of permanent pie-shaped traditional magnets A such as may be used to form a segment of a Halbach array is shown for reference in FIG. 6B. In contrast to these traditional permanent magnets, a pie-shaped cross section PM Wire produced by the continuous process may be defined as having an inner radius R2' and outer radius R1' of the invention is depicted in FIG. 6C. The outer radius R1' of the PM Wire may be, for example much less than the outer diameter R1 of the traditional permanent magnet, allowing for a smaller diameter engine. Also, the length L' of the PM Wire produced by the process of the invention may much longer than the length L of a traditional permanent magnet A because the process of the invention is continuous, allowing less expensive and much easier construction of a longer engine comprising, for example, dual coaxial Halbach arrays (or a single Halbach array, if desired) because the for assembling together a plurality of pie-shaped permanent magnets along the axial direction, as would be required to construct a motor of length L' using traditional pie-shaped permanent magnets as shown in FIG. 6B, is eliminated. This is yet a further distinct advantage of the process of the invention—the elimination of the need to assemble a plurality of traditional permanent magnets in the longitudinal direction in order to construct a Halbach array of desired length L' as shown in FIG. 6B. Assembly of such a plurality of traditional magnets A into an array forming a long pie-shaped magnet is difficult, expensive, and requires special tooling because of the magnetic forces acting on the individual magnets A. In contrast, by using pie-shaped PM Wire produced by the process of the invention, the need for this assembly tooling is eliminated because the pie-shaped PM Wire may be produced and cut to the desired length, and the individual pie-shaped PM Wire segments of desired length are easily assembled together and the tubes may be affixed by any mechanical means known in the art. For example, the pie-shaped PM Wire segments may be assembled into place and welded together using known fabrication techniques such as electron beam welding. If the Curie temperature can be exceeded in the welding process the PM Wires must be glued together. The result is lower cost and higher speed fabrication and assembly. The sintered, magnetized powdered metal alloy 002 is contained with the pie-shaped tube 001 as shown in FIG. 6C.

In FIG. 7, an outer Halbach array comprises a plurality of PM Wire segments 003, and an inner Halbach array comprises a plurality of pie shaped PM Wire segments 004. The two Halbach arrays, the outer shell, stator 006 and engine shaft 005 are coaxial with the longitudinal axis of the engine.

Figure 8:
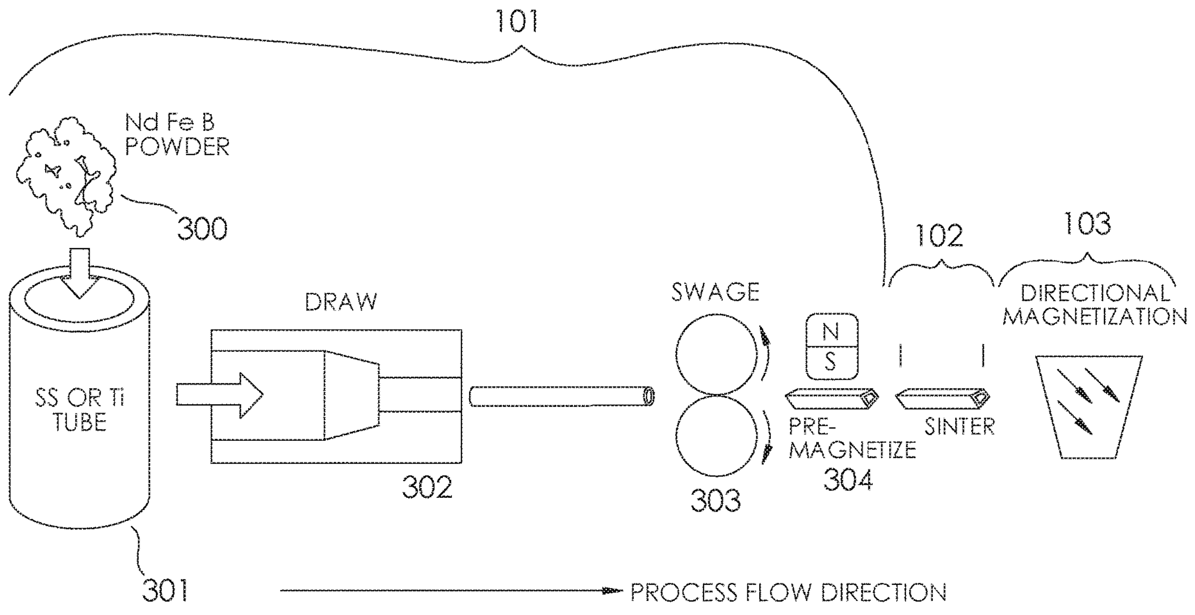
FIG. 8 depicts a pictorial diagram of the steps for manufacturing PM Wire of the invention. In the figures, like item callouts refer to like elements.

Referring now to FIG. 8, the steps of an exemplary embodiment of the process for producing PM Wire are pictorially depicted. In the embodiment shown, step 101 comprises placing the powdered metal alloy, such as, for example, NdFeB powder 300, into a tube of any desired cross sectional shape or length 301. The tube with powdered metal alloy inside is then drawn through a die 302 and subsequently swaged 303 and pre-magnetized 304. Then, in step 102, the powder-in-tube is sintered 102 and magnetized with powerful electromagnets 103, producing a permanent magnet of a desired cross sectional shape and desired magnetization.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

Within the scope of the invention are both the processes and methods described herein and the products produced thereby.

What is claimed is:

1. A method of manufacturing a permanent magnet comprising the steps of:
- providing a metal alloy powder;
- placing the metal alloy powder into a non-magnetic container, the container being a tube of any desired cross-sectional shape and then sintering the metal alloy power while in the container; and
- magnetizing the metal alloy powder while in the container; and
- wherein the permanent magnet comprises the magnetizing sintered metal alloy powder in the container without any need for machining or surface coating; and
- wherein the permanent magnet comprises the magnetized sintered metal alloy powder and the container.

2. The method of claim 1, wherein the container comprises a non-magnetic metal.

3. The method of claim 1, wherein the step of providing a metal alloy powder comprises the steps of:
- heating a plurality of magnetic metals to their melting point under vacuum to create a metal alloy;
- allowing the metal alloy to cool and solidify; and
- grinding the metal alloy into a powder.

4. The method of claim 1, wherein the metal alloy comprises neodymium, iron and boron.

5. The method of claim 1, wherein the metal alloy does not comprise any rare-earth metals.

6. The method of claim 1, wherein the method of manufacturing a permanent magnet further comprises the step of compressing the metal alloy powder and the container subsequent to placing the metal alloy powder into the container.

7. The method of claim 5, wherein the method of manufacturing a permanent magnet further comprises the step of magnetically aligning the metal alloy powder while the metal alloy and container are being compressed.

8. The method of claim 5, wherein the method of manufacturing a permanent magnet further comprises the step of magnetically aligning the metal alloy powder subsequent to drawing the metal alloy powder and the container.

9. The method of claim 1, wherein the process of magnetizing the metal alloy powder while in the container results in a direction of magnetization that is aligned with a longitudinal axis of the container.

10. The method of claim 1, wherein the process of magnetizing the metal alloy powder while in the container results in a direction of magnetization that is transverse to a longitudinal axis of the container.

11. The method of claim 1, wherein the process of magnetizing the sintered metal alloy powder comprises:
- placing the container, with the sintered metal alloy powder inside, between poles of an electromagnet; and
- energizing the electromagnet.

12. The method of claim 1, wherein the container is elongate, having a length, with an aspect ratio of the elongate length of the container to a cross section of the container results in a wire-like shape of the permanent magnet.

13. The method of claim 1, wherein the container is an elongate tube having a circular cross section.

14. The method of claim 1, wherein the container is an elongate tube having a square cross section.

15. The method of claim 1, wherein the container is an elongate tube having a pie-shaped cross section.

* * * * *